United States Patent

Roschynialski

[11] 3,879,781
[45] Apr. 29, 1975

[54] PONTOON BOAT TRAILING ASSEMBLY
[76] Inventor: Stanley Roschynialski, Rt. 1, Grand Island, Nebr. 68801
[22] Filed: Oct. 18, 1972
[21] Appl. No.: 298,782

[52] U.S. Cl. ............................... 9/1 T; 280/414 A
[51] Int. Cl. ............................................ B63c 13/00
[58] Field of Search .................. 9/1 T, 1 R; 114/61; 115/1 R, 1 A; 280/414 R, 414 A; 254/147

[56] References Cited
UNITED STATES PATENTS

| | | | |
|---|---|---|---|
| 3,300,796 | 1/1967 | Powers | 9/1 T |
| 3,335,437 | 8/1967 | Judkins | 9/1 T |
| 3,414,917 | 12/1968 | Harrington | 9/1 T |
| 3,608,111 | 9/1971 | Herden | 9/1 T |
| 3,629,884 | 12/1971 | Brown | 9/1 T |

Primary Examiner—Trygve M. Blix
Assistant Examiner—Sherman D. Basinger
Attorney, Agent, or Firm—Hiram A. Sturges

[57] ABSTRACT

A trailing boat system comprising a pontoon boat and a trailing assembly attached to the pontoon boat and having wheels swinging transversely of the length of the trailer and boat upwardly between the pontoons for storage, and cable-pulley assemblies manually controllable to swing the wheels and to extend and retract a tongue simultaneously.

5 Claims, 10 Drawing Figures

PONTOON BOAT TRAILING ASSEMBLY

FIELD OF THE INVENTION

This invention is in the field of pontoon boat trailing assemblies, of a kind in which wheels retract upwardly from road to storage positions, and a towing tongue must move from a position for road travel in which its hitch is low to a position in which its hitch is higher for being out of the water for water travel.

DESCRIPTION OF THE PRIOR ART

The most common trailer for pontoon boats is a type very similar to the most common trailers used for single-hulled boats, in the sense that none of the trailers commonly used are adapted to remain on a boat while the boat is on the water.

Pontoon boats present an opportunity to retract wheels up between the pontoons and this possibility was recognized in the patent to L. A. Powers, issued Jan. 31, 1967, Pat. No. 3,300,796, titled: PONTOON BOAT AND TRAILER THEREFOR. However, the Powers concept involves storing the wheels in position such that their axles remain in a horizontal position and the lower sides of the tires would drag in the water, particularly since the water level at any point under a pontoon boat changes from moment to moment as the tops of waves go by. The engagement of a wheel stored in this position with the water represents a substantial frictional drag, slowing down speed and making the use of such a trailer much less desirable.

It is much simpler to provide a wheel-raising system for wheels that remain vertical at all times than it is for wheels that move upwardly and inwardly for storage in substantially horizontal positions so as not to interfere with forward movement of the boat by setting up water resistance to the tops of waves. In addition, the simplicity of such a system must be in accord with the conditions under which it operates, since it operates unprotected from the elements such as waves and for the most part, rain, it is important that such a system be designed for both ease of operation and economy.

Another difficulty with the prior art concept has been the undesirability of having a long tongue projecting forwardly from the pontoon boat at all times while it is in operation in the water. Such a long tongue is unsightly and this detracts from such use as a trailer of that type might otherwise receive.

In addition it is important that a boat by symmetrical for attractive appearance, and the storage position of the tongue must be in symmetry with the boat for good appearance. This is particularly important because a tongue projects forwardly where it is visible.

The prior art concept involved moving a forward part of a tongue from a vertically depending road position to a horizontal water position, but the changing of the forward portion of the tongue, from one position to the other, was something that could not be done by an operator standing on the boat and therefore becomes a relatively awkward operation that cannot be done while out in the water, but must be done near the shore, or by a swimmer, if one is available.

With an ideal trailer, a single person would be able to launch a boat with the trailer still under it by simply unhitching the trailer from a car, climb aboard, start the motor and go out into the lake to raise the wheels and retract the tongue at leisure.

Such an ideal operation would be a great contrast to the present practice in which the trailer remains with the car and the boat tends to blow in the wind into a position such that it would be caught by the wind while the boat is partially removed from the trailer, so as to be blown sidewise to the shore line and perhaps be damaged on rocks. Removal of a pontoon boat from a trailer is difficult because the trailer tends to become carried by the wind and waves, with the boat in sidewise position of the shore line, since the trailer is caught between the two pontoons.

In bringing a pontoon boat out of the water sidewise drifting problems are just as great.

These unsolved launching and removal problems are, I believe, the reasons pontoon boats haven't been more popular than they are since their features of stability, economy, and large deck area would bring popularity, it would seem, if these problems were solved.

SUMMARY OF THE INVENTION

A trailer for a pontoon boat and having wheels swinging transversely of the length of the trailer and boat upwardly between the pontoons for storage, and cable and pulley assemblies manually controllable to swing the wheels and to extend and retract a tongue simultaneously, the trailer having a control crank the rotation of which will cause the tongue to move rearwardly from road position toward storage position, the tongue having an inclined member on its underside engageable with the frame for causing the tongue to move more abruptly upwardly as the tongue approaches its storage position so as to bring the tongue up into a horizontal position of minimum engagement with the water, and lock means for holding the tongue in storage position, whereby a single operator, after launching a boat with the trailer under it, can easily move the wheels and tongue into storage position, and whereby a single operator can, upon approaching shore, lower the wheels and tongue into road positions so that the boat and trailer assembly is ready for attachment to a towing vehicle, the cable and pulley assemblies being attached to the tongue in a manner causing the wheels to move from road to water positions simultaneously with the movement of the tongue from road to water position and vice versa.

DESCRIPTION OF THE PREFERRED EMBODIMENT

Figures 6, 7, 8, 9:
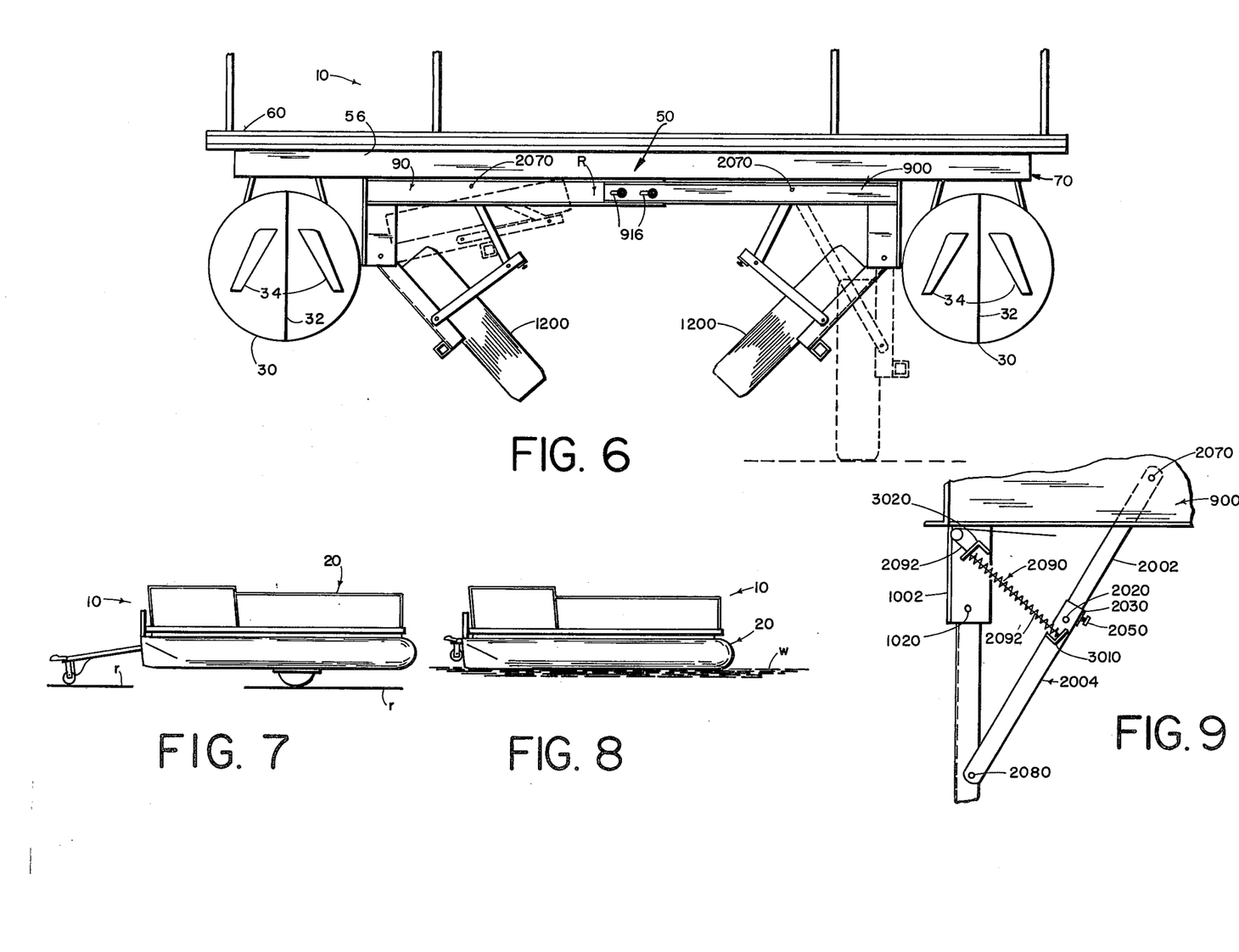
FIG. 6 is a view of the rearward section of the trailer frame shown beneath a pontoon boat, the forward section of the trailer frame not being shown, and the tongue not being shown, full-line positions of wheels and wheel carriages showing the wheels in a partially up-raised position, the dotted-line position of the wheel and wheel carriage on the starboard side being illustrative of the storage positions thereof, the dotted line positions of the wheel-supporting assembly on the port side, and of the corresponding wheel, being shown in road travel position, with the roadway shown in dotted lines therebeneath.
FIG. 7 is a side elevation of the trailer and pontoon boat assembly of this invention shown in a position of rest on a roadway preparatory to hitching onto a vehicle.
FIG. 8 is a side elevation of the pontoon boat and trailer assembly of this invention shown on the water with its wheels and tongue retracted.
FIG. 9 is a detail showing a portion of the rearward frame section and an portion of the starboard wheel-supporting assembly as seen from the forward side thereof and illustrating a linkage biasing spring mechanism.

The amphibious pontoon trailing boat system of this invention is generally indicated at 10 in FIGS. 6, 7 and 8, and has as one of its parts a pontoon boat 20 of conventional construction.

The pontoon boat 20 has two parallel pontoons 30 extending forwardly and rearwardly. The forward ends of the pontoons are distinguishable by being pointed at a prow 32 and have upwardly and forwardly slanting innerside and outerside water deflection fins 34, these features being optional.

The pontoons are spaced apart a substantial distance and are interconnected by a deck support frame 50 having a plurality of deck support beams 56 extending from port to starboard, which latter are connected to the pontoons and support a deck 60. The deck support frame 50 can also be called an upper frame 50, since it is an upper part of a two-part general frame means indicated generally by the numeral 70 in FIG. 6.

The new trailer or trailing assembly of this invention is generally indicated at 80 and is provided with a trailer assembly frame or lower frame generally indicated at 90, called a lower frame 90 because it forms a lower frame part of the two-part frame 70 which includes the upper frame or pontoon frame 50 as its other part, the trailing assembly frame or lower frame has a forward frame section F and a rearward frame section generally indicated at R.

The forward and rearward frame sections on the lower or trailing assembly frame 90 are interconnected by means of both being attached separately to the deck support beam 56 of the pontoon boat 20, whereby, in a sense, the completion of the trailing assembly frame or lower frame 90 can be thought of as including the forward section F, the rearward section R, and an intermediate section which is actually a part of the pontoon boat deck support structure 50, these three sections being referred to herein as the trailing assembly frame 90.

Figure 10:
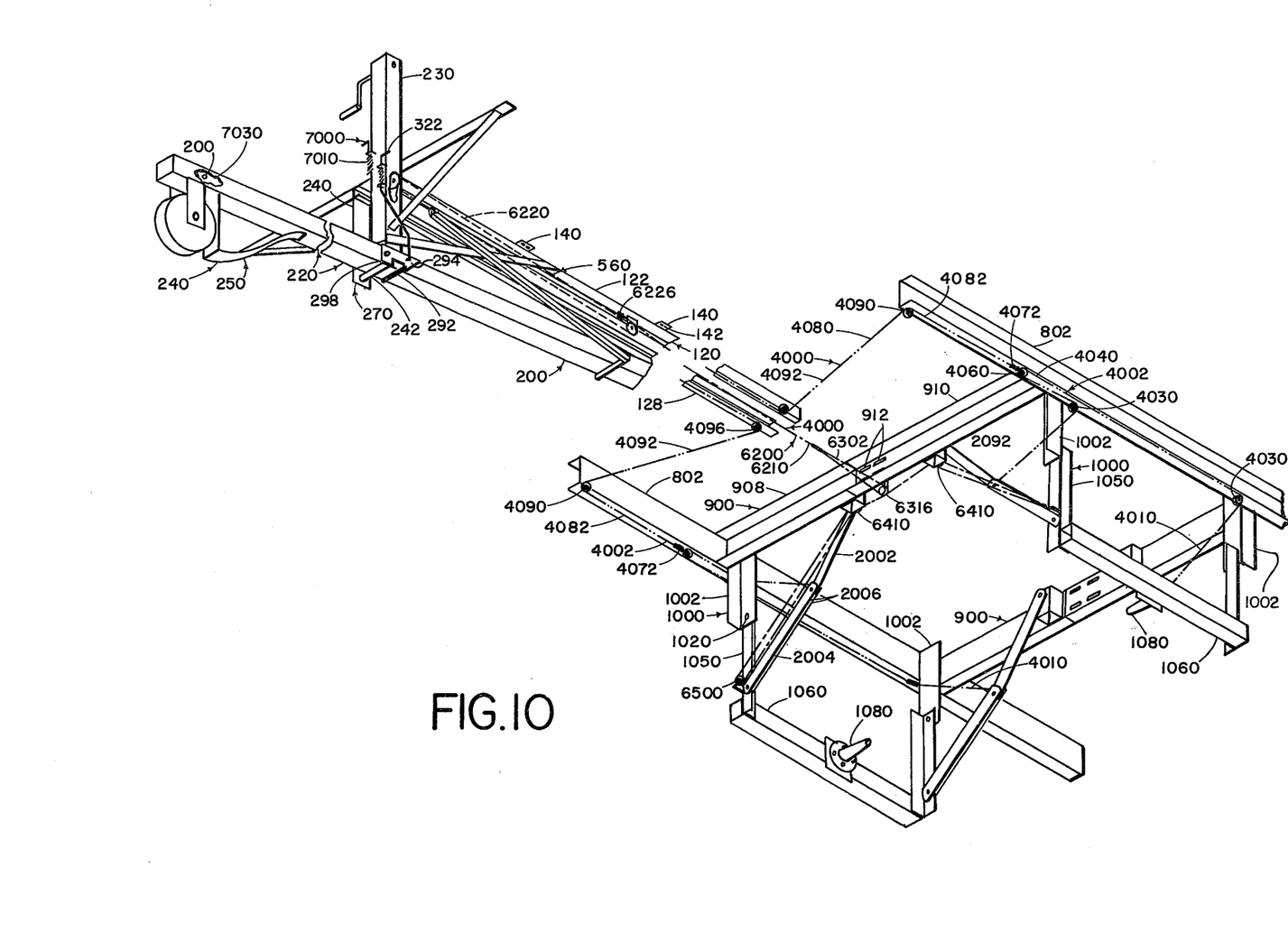
FIG. 10 is a perspective view of the trailer as seen from the lower left-hand side thereof looking upwardly and rearwardly along the trailer, the wheels not being shown thereon, parts of the trailer being shown in road-travel positions.

As best seen in FIG. 10, the forward frame section F comprises a channel member 120 which opens downwardly on its underside and is provided with side flanges 122 from which horizontal bottom flanges 124 extend inwardly short distances, leaving the underside of the channel provided with an elongated opening 128.

Figures 1, 2, 3, 4, 5:
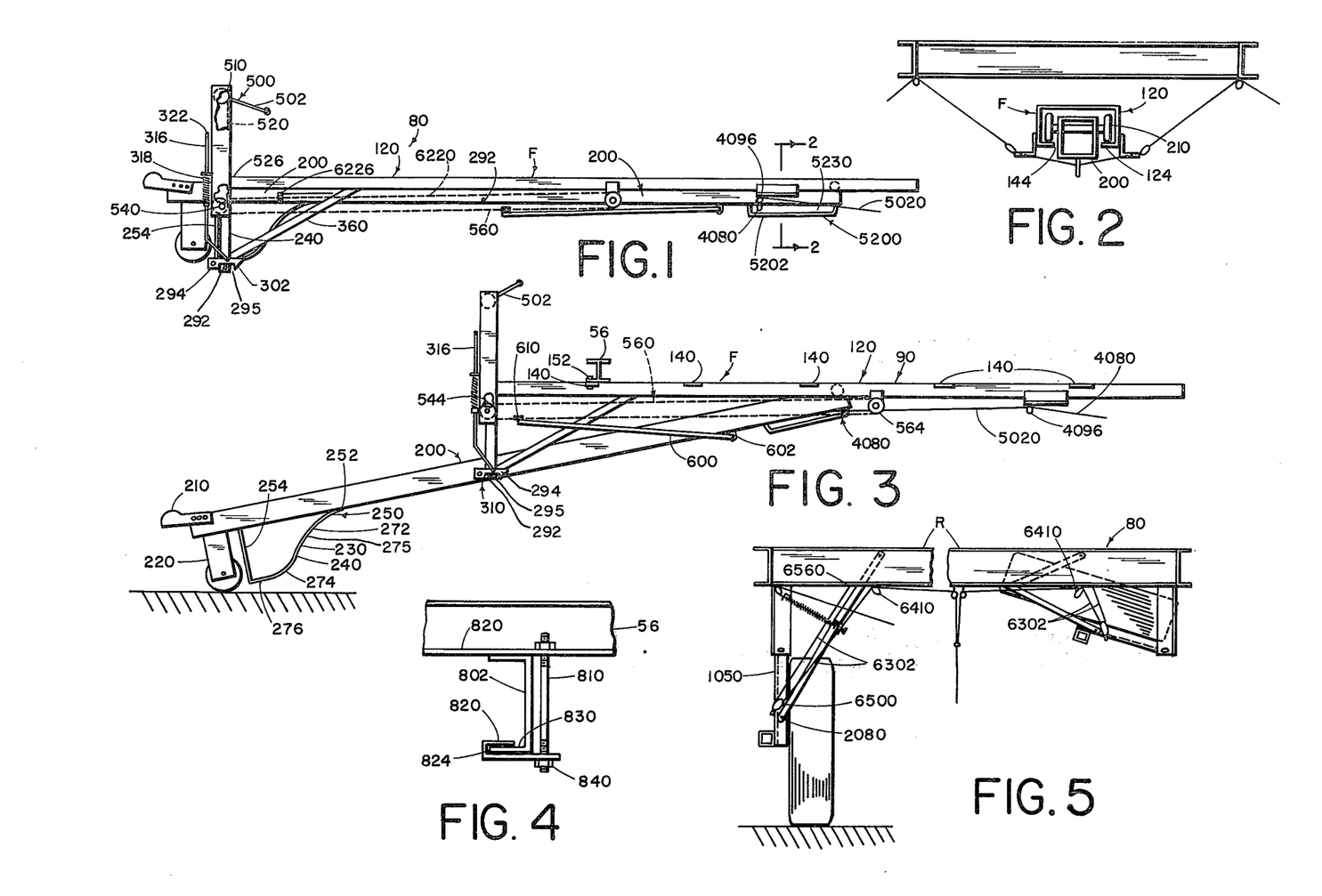
FIG. 1 is a side elevation of the forward one of the two trailer frame sections shown with the tongue in storage position for water travel, a portion of a crank assembly post being broken away to show the interior, portions of the crank assembly chain and portions of an endless chain for tongue control being shown in dotted lines.
FIG. 2 is a sectional view taken along the lines 2—2 of FIG. 1 and looking rearwardly in a manner for showing the upper portion of the rearward section of the frame, the latter not appearing in FIG. 1, the remainder of the rearward section of the frame not being shown in FIG. 2.
FIG. 3 is a side elevation of the forward section of the frame shown with the tonge disposed thereon in a forwardly extended road travel position, a endless cable being shown in dotted lines for clarity of illustration, except for a small portion thereof, a portion of the ground surface being shown in section.
FIG. 4 shows in cross-section one of the deck beams of the pontoon boat showing the method of attachment of the longitudinal side beam on the starboard side of the trailer thereto.
FIG. 5 is a frontal elevation of the rear section of the trailer frame shown with a starboard wheel-supporting assembly in road position with a part of the roadway shown in section therebeneath, a portion of the rear frame section of the trailer being broken away and the port side wheel-supporting assembly being shown with the parts thereof in a wheel storage position, the wheel being shown in dotted lines, partially.

The channel member 120 of the forward frame section F has a plurality of lugs 140 extending horizontally from its upper sides, the lugs 140 having openings 142 therein for receiving bolts which attach the channel member 120 to the horizontal lower flange of the deck support means 56 respectively of the pontoon boat, one of which is shown in full lines in FIG. 3 to illustrate this, the attachment being by means of bolts one of which is illustrated at 152 in FIG. 3.

As best seen in FIG. 2, the opening or slot 144 in the underside of the channel member 120 can receive a part of the rearward end of an elongated tongue 200 therein so that the tongue is adapted to slide back and forth on a roller assembly 210 which rides on the upper sides of the horizontal flanges 124 so that the tongue 200 is freely slidable forwardly and rearwardly with respect to the front frame section F.

Referring to FIG. 1, it will be seen that the forward end of the tongue 200 has the ball portion of a trailer hitch 210 attached thereto and has a supporting wheel assembly 220 extending downwardly therefrom.

The tongue 200 has an inclined surface member 230 on the underside thereof and the latter forms a part of a forward section 240 of a tongue-raising means 250.

The inclined surface member 230 is fixed at an upper rearward end to the tongue 200 at 252 and its forward end is supported by a brace 254 attached also to the tongue 200.

The forward end of the forward frame section F is provided with a post 230 secured thereto and extending upwardly therefrom. Beneath the post 230 extending downwardly on both sides of the forward frame section F are a pair of spaced, rigid guides 240 between which the tongue 200 is received for guiding the tongue 200 and maintaining it in alignment with the forward frame channel 120.

All seen in FIG. 10, the undersides of the upright guides 240 are interconnected by a support roller and deflection assembly 242 which is adapted to maintain the tongue 200 always thereabove so that as the tongue 200 moves forwardly and rearwardly, it will roll on the roller assembly 242 and be supported thereby.

The rigid guides 240 and the roller and deflection assembly 242 together form a rearward section 270 of a tongue-raising assembly 250, earlier described.

The inclined surface member 230 has a rearward surface 275 having a first portion 272 which extends forwardly and downwardly from its rearward end and is slightly concave on its rearward side joining with a forward portion 274 of the rearward surface 275 of the inclined surface member 230. The forward portion 274 of the rearward surface 275 is convex on its rearward side in its upper part and becomes substantially horizontal at its forwardmost portion 276.

As thus described, as the tongue 200 is moved rearwardly, the inclined surface member 230 will strike the roller and deflection assembly 242 causing the forward end of the tongue to move upwardly as it moves rearwardly until the forward end of the tongue is against the underside of the forward frame channel 120 and in a position of maximum retraction, as shown in FIG. 1, in which a lock pin 292 attached to the tongue 200 and protruding outwardly from one side thereof becomes engaged with the latch 294 which receives the lock pin 292 in a notch 295 in the underside of the latch thereby preventing the tongue from moving forwardly or rearwardly. The latch 294 is pivotally secured by suitable means indicated at 298 to the lower end of one of the guides 240 so that the rearward end of the latch 294 is free to swing upwardly and downwardly.

The rearward end of the latch 294 has inclined surfaces 302 which are each inclined from an upper rearward end to a forward lower end, so as to be struck by the lock pin 292 as it and the tongue move forwardly for causing the latch 294 to be moved upwardly in order to receive the lock pin 292 in a notch 295 thereunder.

The latch 294 and the pin 292 form parts of a tongue-locking mechanism or assembly 310, as shown in FIG. 3.

The latch 294 is pivotally attached to a latch-holding rod 316 which extends upwardly therefrom and which is urged downwardly by a spring assembly 318 attached to the post 230, although the latch 294 can be raised manually by an operator's pulling on a handle 322 at the upper end of the rod 316, as best seen in FIG. 10.

The brace means 360 seen in FIG. 1 rigidly connects the frame 120 to the lower end of the post 230.

Referring to FIG. 1, it will be seen that the lock pin 292 projects out from both the sides of the tongue 200 in a position for engaging right and left inclined surfaces 302 of the latch 294. The inclined surfaces 302 incline upwardly and rearwardly at an angle of approximately 30°. As the tongue moves forwardly it pivots from its rearward end until the pin 292 blocks further forward movement of the tongue 200 by engagement in the latch 294 so that the tongue 200 cannot move upwardly or rearwardly because the latch 294 is held firmly in place by the rod 316 and the tongue 200 cannot move downwardly because of the supporting roller assembly 242 seen in FIG. 10.

Referring to FIG. 1, a manually operated control assembly is generally indicated at 500 and has a crank handle 502 which can be operated by an operator who is standing on the deck of the pontoon boat, provided the operator kneels or squats on the deck. The manually operable control assembly 500 has its crank 502 mounted on the post 230 in a manner for rotating an upper gear 510 of a vertical endless chain assembly, mostly shown for convenience of illustration in dotted lines at 520 in FIG. 1, the chain assembly 520 operating a lower gear 526 disposed on the post 230 down below the main frame channel F and mostly below the upper position of the tongue 200, as is possible because the tongue 200 moves upwardly and downwardly between the guides 240 and the post 230, as best seen in FIG. 10 is offset to the starboard side of the space between the guides 240.

The lower gear 526 causes rotation of a shaft 540, best seen in FIG. 1, and the latter is attached to another gear best seen at 544, the gear 544 carrying an endless chain 560, which latter has its rearward end extended about gear 564, the latter being suitably attached to the underside of the forward frame channel 120 a distance rearwardly along the frame channel 120 from the gear 544 which is a distance as much or greater than the distance it is desired to cause the tongue 200 to move forwardly and rearwardly.

A stiff tongue-controlling link 600, seen in FIG. 3, is pivotally attached to the underside of the tongue 200 by suitable means 602, and the link 600 has its forward end attached to the endless chain 560 at a certain section of the chain 560 which is shown at 610, the certain section 610 moving backward and forward as the crank 502 is turned in each direction respectively. Movements of the endless chain 560 and the link 600 will cause movements of the tongue 200 all the way from a rearward storage position shown in FIG. 1 to a forwardly extended position for road travel as shown in FIG. 3.

We refer now to the rearward frame section R best seen in FIG. 5 and 6, the latter having two forwardly to rearwardly extending longitudinal frame members 802 which are spaced apart a distance so as to be snugly receivable up between the pontoons 30, one of the longitudinal frame members 802 being seen in FIG. 4 and being attached to one of the deck-supporting beams 56 of the pontoon boat by means of a bolt 810 extending upwardly through a flange 820 of the beam 56, the bolt 810 extending down one side of the longitudinal member 802 and being suitably secured to a bracket 820 having a notch 824 therein which receives the terminal edge of a lower flange 830 of the respective beam 802 in a manner such that the easy removal of the bracket 820 can be accomplished by removing a nut 840 which is in an easily accessible position.

It is to be understood that many brackets 820 are provided, one at each of the deck beams 56 for securely fixing the longitudinal frame members 802 of the trailer to the pontoon boat.

The rear frame section R of the trailer frame 90 further has a pair of transversely extending frame assemblies 900, best seen in FIG. 10, which can be in the form of a pair of telescopically overlapping transverse frame members 908 and 910, which latter are secured together at 912 in any selected amount of overlapping so as to adjust to pontoon boats of different widths, the bolts 912 fitting in horizontally elongated slots 916, best seen in FIG. 6, which permit this adjustment.

Referring now to FIG. 10, it will be seen that the trailer has a pair of wheel-supporting assemblies generally indicated at 1000, and which latter are disposed one on the port and one on the starboard side of the trailer, each of the assemblies 1000 having an outer rigid member 1002 at a forward end and also at a rearward end of the respective assembly 1000, the rigid members 1002 being rigidly secured to the rear frame members 802 and 908 and having at their lower ends pivot means 1020 to which are attached swinging rigid members 1050 respectively in a manner whereby the members 1050 can swing from vertical positions shown in FIG. 10 upwardly and inwardly, as shown in FIG. 6, until they are in storage position shown in dotted lines by illustration at the left side of FIG. 6.

Each of the swinging rigid members 1050 has a forwardly to rearwardly extending connector 1060 attached to its lower end and interconnecting the forward and rearward ones of the starboard or port pair respectively of the swinging rigid members 1050, so that axle-mounting means 1080 can be mounted on the innersides of the interconnecting members 1060 for supporting wheels rotatably, the latter being seen at 1200 in FIG. 6.

Each wheel-supporting assembly 1000 has a forward and rearward pair of hinging, bracing linkages 2002 and 2004, which latter, are interconnected at adjacent ends by a pivot means 2020. Each lower linkage means 2004 has two parts 2006, as best seen in FIG. 10, which latter are disposed on the forward and rearward sides respectively of the respective upper link 2002, and a retainer 2030, seen in FIG. 9, interconnects the members 2006 on the innersides thereof and engages the upper link 2002 associated therewith at a point disposed upwardly of the pivot bolt 2030 so as to provide a knee action, or in other words, a one-way pivoting by engaging the upper link 2002 and preventing a hinging of the linkage means 2002 and 2004 in a manner such that the pivot means 2020 moves inwardly of a side of the trailer whereby pivoting can only occur with bolt 2030 moving outwardly toward an outer side of the trailer.

As seen in FIG. 9, adjustment can be provided by having a set screw 2050 threadedly mounted in the detainer 2030 and adjustable for engaging the link 2002 at a point desired.

The upper end of each link 2002 is pivotally attached by suitable means 2070, best seen in FIG. 6, to a respective transverse rear frame means 900, as best seen in FIG. 6.

The lower linkage means 2004 is pivotally attached by a bolt 2080 to a lower portion of a respective swinging member 1050, all described pivots being along parallel horizontal axes extending forwardly and rearwardly of the trailer.

A linkage bending initiation spring assembly is generally indicated at 2090 in FIG. 9 and comprises a spring 2092' held in place by a device comprising the positioning of the spring 2092' around a cable 2092, which latter is attached to a bracket 3010 on a lower linkage member 2004 and against which latter member the spring 2092' bears, the upper end of the spring 2092' bearing against bracket 3020 fixed to an upper rigid member 1002 so that the other end of the spring 2092' is fixed in place for urging the linkages 2002 and 2004 in such a manner that their pivot bolt 2020 is urged inwardly of the trailer so as to tend to initiate movement of the linkages 2002 and 2004 away from positions for rigidly holding the wheels in road travel positions and into folding positions.

Referring now to FIG. 10, it will be seen that a cable and pulley assembly is there generally indicated at 4000, and has, as a part thereof, a maintenance device generally indicated at 4001, which latter is to maintain the linkages 2002 and 2004 in road positions.

The maintenance device 4001 has starboard and port rearward cables 4002, each of which latter has two ends connected one each in the respective lower links 2004 on the respective side of the trailer in a manner shown at FIG. 9 in which the cable portion 2092 of FIG. 9 is simply one end of the rearward cable 4002, another end section of the rearward cable 4002 being also seen in FIG. 10 at 4010 and corresponding to the cable section 2092 but attached to a rearward set of hinging linkages 2002 and 2004.

Each cable section 2092 or 4010 of the road position maintenance device 4001 extends upwardly and outwardly from its lower end when the linkages 2002 and 2004 are in road positions extending at their outer ends about pulleys 4030 respectively which are disposed two on each side of the trailer and are attached to the undersides of the horizontal frame members 820, the cable 4002 having a central section 4040 which is in loop shape with its ends joining the cable section 2092 and 4010 at the pulleys 4030, but at the center being in a loop extended across a moving pulley 4060 of which latter there are two, one on the starboard and one on the port side of the trailer, each connected to springs 4072 disposed forwardly thereof, and each spring 4072 being attached to a forward cable 4080 at one of the ends thereof. The forward cable 4080 has rearwardmost portions 4082 extending forwardly from the springs 4072 to pulleys 4090 attached to the forward ends of respective longitudinal trailer frame members 802.

The forward cable 4080 extends forwardly from each pulley 4090 in sections 4092 which extend forwardly and inwardly to pulleys 4096 on the rearward end of the channel 120 of the forward frame section F.

From the pulleys 4096 the forward cable section 4080 has respective portions 5020 which are joined together at the forward ends where they extend around a cable pulling assembly 5200, which latter is formed by a rod 5202 having a horizontal central portion disposed beneath a rearward part of the tongue 200, but spaced therefrom and having its ends attached to the tongue 200, whereby the cable forward section 4080 is received in a slot 5230 between the rod 5202 and the tongue 200.

As thus described, as the tongue 200 is moved forwardly by the mechanism earlier illustrated, the forward part or section 4080 of the cable and pulley assembly 4000 will not at first be pulled forwardly because the cable portions 5020 will be slack. And so there is a delayed action in the pulling on the cable section 4080 as the tongue moves forwardly, whereby the cables 2092 and 4010 are pulled to hold the linkages 2002 and 2004 in road positions, at the same time tensing the springs 2092'.

As seen in FIGS. 1 and 3, this delayed action must be enough so that as the tongue 200 moves forwardly toward the road position, the respective road position maintainance device 4001, including its cables 2092 and 4010, will not tense until the tongue has moved forwardly enough so that remaining tongue motion (remaining after the cable sections 5020 have started to be pulled by the rod 5202) is of a distance enough to remove all remaining slack in the cables 2092 and 4010, so they will pull the linkages 2002 and 2004, (and also the wheels, into road positions against the floating tendency of the tires and also against the force of the springs 2092' which compress.

Referring now to FIG. 10, it will be seen that the cable and pulley assembly 4000 has a wheel-raising section, generally indicated at 6200, which latter has a forward cable 6210 which is attached to an upper section 6220 of the horizontal endless chain 560 by a suitable clamp 6226 so that as the chain 560 moves in a direction for causing the tongue 200 to move toward storage position, the upper portion of the chain will move forwardly pulling on the cable 6210 and thereby pulling on two cables 6302 which are attached to a rearward end of the cable 6210 forwardly of a pulley 6316 which is mounted on the rear frame R of the trailer midway between the sides thereof and on the forward side of the transverse frame means 908, 910. The pulley 6316 is a double pulley, whereby the cables 6302 extend therefrom to the starboard and port sides of the trailer respectively where they extend around outer upper pulleys 6410, seen in FIG. 5, and thence downwardly and outwardly to lower pulleys 6500 which are attached to the lower portions of the swinging frame members 1050, as seen in FIG. 5 and 10, the cables 6302 extending around the pulleys 6500 respectively, and then upwardly to points at which they are anchored by suitable means at 6560 on to the underside of the forward transverse frame assembly 900 of the trailer, whereby the downwardly and upwardly extending parts of the cable 6302 which extend around the pulleys 6500 respectively are parallel with each other on the starboard and on the port sides respectively of the trailer, and whereby the pulley 6500 is disposed adjacent to and slightly above the pivot connection 2080 at the lower end of each respective lower linkage means 2004 and is best seen in FIG. 5.

As thus described, as the tongue moves rearwardly, the forward cable 6210 of the wheel-raising cable assembly 6200 will be drawn taut for raising the wheels which at that time can be easily done because the links 2002 and 2004 of each pair of links will be urged into a bent or hinged position by the respective springs 2092.

As thus described, the invention provides an amphibious craft able to travel on land and sea and to be launched and removed from the water with efficiency so greatly needed that, in the past, most of the pontoon boats in some areas are never launched at all, but are left out at buoys all summer long.

When the tongue 200 is in the upper position, it can be locked in that position by a tongue upper position latch assembly generally indicated at 7000 in FIG. 10, which latter has a latch is urged downwardly by the spring 7010 suitably mounted on the post 230 for that purpose, the lower end of the latch 7000 being engageable in a suitable opening in the upper side of the tongue which latches opposite at times when the tongue is in the full storage position shown in FIG. 1, such opening being seen at 7030 in FIG. 10 by means of breaking away a side portion of the tongue 200 which is a box-beam so that the upper side of the channel can be seen with the hole 7030 therein to receive the lock latch 7000.

I claim:

1. A trailing boat system comprising: a pontoon boat having two spaced pontoons on the starboard and port sides of the center of said boat, said boat having a frame means connecting said pontoons and a deck supported on and connected to said frame, port and starboard wheel supporting assemblies, means attaching said wheel supporting assemblies to said frame means, port and starboard wheels mounted on said wheel supporting assemblies respectively, said wheel supporting assemblies being adapted to permit said wheels to be disposed in downward road positions in which the undersides of said wheels are disposed below the undersides of said pontoons and also in upper storage positions in which latter said wheels are disposed upwardly from their respective road positions, and manually operable control means operatively correlated with said wheel supporting assemblies for causing said wheels to be movable from one to the other of said wheel positions, said wheel supporting assemblies comprising upper rigid anchor members attached to said frame means, swinging rigid means pivotally attached and extending downwardly from said anchor members respectively, said swinging rigid means each being attached to said anchor members respectively in a manner for the swinging of the lower part of each swinging means inwardly and upwardly of said trailer from outer lower road positions to inner upper storage positions, means rotatably attaching said wheels respectively to said swinging members in a manner such that said wheels are in road travel positions at times when said swinging members are in their downward positions and so that said wheels are in upper storage positions at times when said swinging members are in their respective storage positions, and each wheel support assembly having hinging bracing linkage means facilitating the maintenance of the respective swinging means in road positions but adapted to fold for permitting the respective swinging means to swing upwardly and inwardly for storage, said hinging bracing linkage means each comprising an upper and lower link forming a pair of links, the links of a pair being pivotally connected at adjacent ends for hinging and said latter pairs having other ends which are pivotally connected one end to the respective said swinging rigid means and one end to said frame means, stop means connected to said hinging bracing linkage means and preventing said latter means from moving out of a road position thereof, each said stop means having as one of its parts a restraining means mounted on one of the links of a pair and engaging the other link of that pair for preventing the adjacent ends of the respective links from moving outwardly excessively beyond desired road positions thereof.

2. A trailing boat system comprising: a pontoon boat having two spaced pontoons on the starboard and port sides of the center of said boat, said boat having a frame means connecting said pontoons and a deck supported on and connected to said frame, port and starboard wheel supporting assemblies, means attaching said wheel supporting assemblies to said frame means, port and starboard wheels mounted on said wheel supporting assemblies respectively, said wheel supporting assemblies being adapted to permit said wheels to be disposed in downward road positions in which the undersides of said wheels are disposed below the undersides of said pontoons and also in upper storage positions in which latter said wheels are disposed upwardly from their respective road positions, and manually operable control means operatively correlated with said wheel supporting assemblies for causing said wheels to be movable from one to the other of said wheel positions, said wheel supporting assemblies comprising upper rigid anchor members attached to said frame means, swinging rigid means pivotally attached and extending downwardly from said anchor members respectively, said swinging rigid means each being attached to said anchor members respectively in a manner for the swinging of the lower part of each swinging means inwardly and upwardly of said trailer from outer lower road positions to inner upper storage positions, means rotatably attaching said wheels respectively to said swinging members in a manner such that said wheels are in road travel positions at times when said swinging members are in their downward positions and so that said wheels are in upper storage positions at times when said swinging members are in their respective storage positions, and each wheel support assembly having hinging bracing linkage means facilitating the maintenance of the respective swinging means in road positions but adapted to fold for permitting the respective swinging means to swing upwardly and inwardly for storage, said hinging bracing linkage means each comprising an upper and lower link forming a pair of links, the links of a pair being pivotally connected at adjacent ends for hinging and said latter pairs having other ends which are pivotally connected one end to the respective said swinging rigid means and one end to said frame means, stop means connected to said hinging bracing linkage means and preventing said latter means from moving out of a road position thereof, holding cable and pulley means forming a part of said stop means and comprising holding cables connected one to each pair of said links and when said holding cables are taut holding said pairs from moving inwardly of said boat at their adjacent ends so as to assist said stop means in holding said pairs of links in road positions.

3. A trailing boat system comprising: a pontoon boat having two spaced pontoons on the starboard and port sides of the center of said boat, said boat having a frame means connecting said pontoons and a deck supported on and connected to said frame, port and starboard wheel supporting assemblies, means attaching said wheel supporting assemblies to said frame means, port and starboard wheels mounted on said wheel supporting assemblies respectively, said wheel supporting assemblies being adapted to permit said wheels to be disposed in downward road positions in which the undersides of said wheels are disposed below the undersides of said pontoons and also in upper storage positions in which latter said wheels are disposed upwardly from their respective road positions, and manually operable control means operatively correlated with said wheel supporting assemblies for causing said wheels to be movable from one to the other of said wheel positions, said wheel supporting assemblies comprising upper rigid anchor members attached to said frame means, swinging rigid means pivotally attached and extending downwardly from said anchor members respectively, said swinging rigid means each being attached to said anchor members respectively in a manner for the swinging of the lower part of each swinging means inwardly and upwardly of said trailer from outer lower road positions to inner upper storage positions, means rotatably attaching said wheels respectively to said swinging members in a manner such that said wheels are in road travel positions at times when said swinging members are in their downward positions and so that said wheels are in upper storage positions at times when said swinging members are in their respective storage positions, and each wheel support assembly having hinging bracing linkage means facilitating the maintenance of the respective swinging means in road positions but adapted to fold for permitting the respective swinging means to swing upwardly and inwardly for storage, said hinging bracing linkage means each comprising an upper and lower link forming a pair of links, the links of a pair being pivotally connected at adjacent ends for hinging and said latter pairs having other ends which are pivotally connected one end to the respective said swinging rigid means and one end to said frame means, stop means connected to said hinging bracing linkage means and preventing said latter means from moving out of road position thereof, a hinging initiation spring means forming a section of said manually operable control means, said hinging initiation spring means operatively correlated between a hinging bracing linkage means and said frame means for initially urging the respective hinging bracing linkage means towards said storage positions.

4. A trailing boat system comprising: a pontoon boat having two spaced pontoons on the starboard and port sides of the center of said boat, said boat having a frame means connecting said pontoons and a deck supported on and connected to said frame, port and starboard wheel supporting assemblies, means attaching said wheel supporting assemblies to said frame means, port and starboard wheels mounted on said wheel supporting assemblies respectively, said wheel supporting assemblies being adapted to permit said wheels to be disposed in downward road positions in which the undersides of said wheels are disposed below the undersides of said pontoons and also in upper storage positions in which latter said wheels are disposed upwardly from their respective road positions, and manually operable control means operatively correlated with said wheel supporting assemblies for causing said wheels to be movable from one to the other of said wheel positions, an elongated tongue extending forwardly from said frame means when said wheels are in said road positions, means mounting said tongue on said frame means so that said tongue is slidable fore and aft with respect to said frame means, and in which said manually operable control means comprises cable and pulley means operably correlated with said wheel assemblies respectively whereby the operator by operating said manually operable control means can cause said cable and pulley means thereof to cause said wheel assemblies to move said wheels from one to the other of said two positions, and a co-action assembly operatively correlated with said cable and pulley means and with said tongue and causing said wheels to move from said storage positions to said road positions simultaneously as said tongue is moving from a storage position rearwardly on said frame to a forward position for road travel, the storage position of said tongue being substantially spaced above the bottoms of said pontoons, said tongue having a towing hitch means on its forward end, and in which said frame means comprises an upper pontoon boat frame and a lower frame, said lower frame having a rear section and a forward section, said lower frame rear and forward sections being free of any interconnection by a means strong enough to rigidly support said lower frame rear and forward section in fixed positions with respect to each other with the exception of said upper frame whereby said trailer has an economy of manufacture achieved by using the upper frame of a pontoon boat to rigidly interconnect said two frame sections of said trailer.

5. A trailing boat system comprising: a pontoon boat having two spaced pontoons on the starboard and port sides of the center of said boat, said boat having a frame means connecting said pontoons and a deck supported on and connected to said frame, port and starboard wheel supporting assemblies, means attaching said wheel supporting assemblies to said frame means, port and starboard wheels mounted on said wheel supporting assemblies respectively, said wheel supporting assemblies being adapted to permit said wheels to be disposed in downward road positions in which the undersides of said wheels are disposed below the undersides of said pontoons and also in upper storage positions in which latter said wheels are disposed upwardly from their respective road positions, and manually operable control means operatively correlated with said wheel supporting assemblies for causing said wheels to be movable from one to the other of said wheel positions, an elongated tongue extending forwardly from said frame means when said wheels are in said road positions, means mounting said tongue on said frame means so that said tongue is slidable fore and aft with respect to said frame means, and in which said manually operable control means comprises cable and pulley means operably correlated with said wheel assemblies respectively whereby the operator by operating said manually operable control means can cause said cable and pulley means thereof to cause said wheel assemblies to move said wheels from one to the other of said two positions, and a co-action assembly operatively correlated with said cable and pulley means and with said tongue and causing said wheels to move from said storage positions to said road positions simultaneously as said tongue is moving from a storage position rearwardly on said frame of a forward position for road travel, the storage position of said tongue being substantially spaced above the bottoms of said pontoons, said tongue having a towing hitch means on its forward end, and in which said frame has two sections, said sections not being interconnected by a means strong enough to rigidly support said frame sections in one position with respect to each other, whereby said trailer has an economy of manufacture achieved by using the frame of a pontoon boat to rigidly interconnect said two frame sections of said trailer.

* * * * *